(12) United States Patent
Lou et al.

(10) Patent No.: US 12,155,278 B2
(45) Date of Patent: Nov. 26, 2024

(54) ROTOR COIL SHAPING DEVICE

(71) Applicant: HENGDIAN GROUP INNUOVO ELECTRIC CO., LTD., Zhejiang (CN)

(72) Inventors: Hailong Lou, Dongyang (CN); Xudong Shu, Dongyang (CN)

(73) Assignee: HENGDIAN GROUP INNUOVO ELECTRIC CO., LTD., Dongyang (CN)

( * ) Notice: Subject to any disclaimer, the term of this patent is extended or adjusted under 35 U.S.C. 154(b) by 604 days.

(21) Appl. No.: 17/434,325

(22) PCT Filed: May 8, 2020

(86) PCT No.: PCT/CN2020/089102
§ 371 (c)(1),
(2) Date: Aug. 26, 2021

(87) PCT Pub. No.: WO2021/088342
PCT Pub. Date: May 14, 2021

(65) Prior Publication Data
US 2022/0271629 A1  Aug. 25, 2022

(30) Foreign Application Priority Data
Nov. 9, 2019 (CN) .......................... 201911091274.5

(51) Int. Cl.
*H02K 15/00* (2006.01)
(52) U.S. Cl.
CPC ............................... *H02K 15/0031* (2013.01)

(58) Field of Classification Search
CPC ........... H02K 15/0031; H02K 15/0037; H02K 15/0018
See application file for complete search history.

(56) References Cited

U.S. PATENT DOCUMENTS

2020/0127525 A1\* 4/2020 Vohlgemuth ........... H02K 3/527

FOREIGN PATENT DOCUMENTS

| CN | 203840150 U | \* | 9/2014 | |
| CN | 105099106 A | \* | 11/2015 | ............. H02K 15/02 |
| CN | 206977273 U | \* | 2/2018 | |
| CN | 110011495 A |   | 7/2019 | |
| CN | 219018633 U | \* | 5/2023 | |
| JP | 2008178168 A |  | 7/2008 | |

\* cited by examiner

*Primary Examiner* — Emmanuel M Marcelo
(74) *Attorney, Agent, or Firm* — Jiwen Chen; Joywin IP Law PLLC

(57) ABSTRACT

An object of the present invention is to provide a rotor coil shaping device which can improve the production efficiency and reduce the labor intensity of workers. The device comprises a locating piece and a press piece located above the locating piece. A locating boss, extending upward and having a width the same as that of a rotor slot opening of a rotor, is provided in the middle of the locating piece in a longitudinal direction, a stop boss extending upward is provided on at least one of front and rear ends of the locating piece, and upper shaping blades each having an arc groove opening downward are fixed on a lower side of the press piece.

5 Claims, 2 Drawing Sheets

ROTOR COIL SHAPING DEVICE

This is a U.S. national stage application of PCT Application No. PCT/CN2020/089102 under 35 U.S.C. 371, filed May 8, 2020 in Chinese, claiming priority of Chinese Application No. 201911091274.5, filed Nov. 9, 2019, all of which is hereby incorporated by reference.

TECHNICAL FIELD OF THE INVENTION

The present invention relates to motor rotor assembly equipment, in particular to a rotor coil shaping device.

BACKGROUND OF THE INVENTION

Rotor comprises a rotor core, a rotor shaft and other components. After winding wires on the rotor core, it is necessary to plug slot sticks into rotor slots of the rotor core and install the slot sticks in the axial direction of the rotor shaft. However, copper wires at both ends of the rotor will block the axial side of the rotor slots, so it is necessary to press coils at both ends of the rotor inward to expose the rotor slots to facilitate the installation of the slot sticks. In the prior art, coils are shaped by manually pressing, but this process is low in efficiency and high in labor intensity of workers.

SUMMARY OF THE INVENTION

An object of the present invention is to provide a rotor coil shaping device which can improve the production efficiency and reduce the labor intensity of workers.

To achieve the above object, a technical solution employed in the present invention is as follows. A rotor coil shaping device is provided, including a locating piece and a press piece located above the locating piece, wherein a locating boss, extending upward and having a width the same as that of a rotor slot opening of a rotor, is provided in the middle of the locating piece in a longitudinal direction, a stop boss extending upward is provided on at least one of front and rear ends of the locating piece, and upper shaping blades each having an arc groove opening downward are fixed on a lower side of the press piece.

In use of the device of the present invention, the rotor is put on the locating piece so that the locating boss is located in a rotor slot on a rotor core, the rotor moves axially to make an axial end face of the rotor core abut against the stop boss, the press piece is pressed down so that a wall of the arc groove of the upper shaping blade is in contact with and tightly presses coils, and then the rotor rotates to press a circumferential surface of the rotor coils. The radial displacement of the rotor can be limited by the locating boss. The stop boss is configured to align the coils with the upper shaping blades to avoid contact between the upper shaping blades and the rotor core when the press piece moves downward.

Preferably, the locating piece is fixed on the locating base which is sleeved on two vertically arranged guide rods, and a lower end of each guide rod is fixed to the base plate; a spring sleeved on each guide rod is provided between the locating base and the base plate, and lower shaping blades, extending upward and having an arc groove opening upward, are provided on the base plate and located under the upper shaping blades. In this way, the area of the coils shaped by pressing increases whenever the press piece is pressed down, so as to improve the efficiency. The locating piece and the locating base may be integrated with each other one piece or the two parts are independent of each other.

Preferably, the upper shaping blade is provided on both front and rear ends of the press piece, respectively, the lower shaping blade is provided at both front and rear sides of the locating base, respectively, and each lower shaping blade is located under each upper shaping blade. In this way, the stability of the device of the present invention is improved in use, to avoid the rotor from overturning when the coils are shaped by pressing.

Preferably, the locating piece is detachably fixed on the locating base. In case the rotor is a skewed rotor, different locating bases, having a locating boss with a skewed angle corresponding to that of the rotor slot, may be replaced.

Preferably, a V-groove opening upward is formed on the locating base and comprises two supporting groove faces aslant arranged to form a V-shaped structure, and the locating piece is fixed in the middle of the V-groove so that the locating piece is located between the two supporting groove faces. The supporting groove face is configured to support the rotor core of the rotor, so as to limit the radial displacement of the rotor and improve the stability of the device in use.

Preferably, the press piece is fixed at an output end of a press, and one end of a guide piece is fixed to the press piece while the other end thereof is located in a vertically arranged guide slot of a fixed plate. The guide piece and the guide slot are configured to guide the press piece to avoid the rotation of the upper shaping blades driven by the press piece.

The present invention has the advantages of improving the production efficiency and reducing the labor intensity of workers.

DETAILED DESCRIPTION OF THE INVENTION

The present invention will be further described below with reference to accompanying drawings by embodiments.

Figure 1:
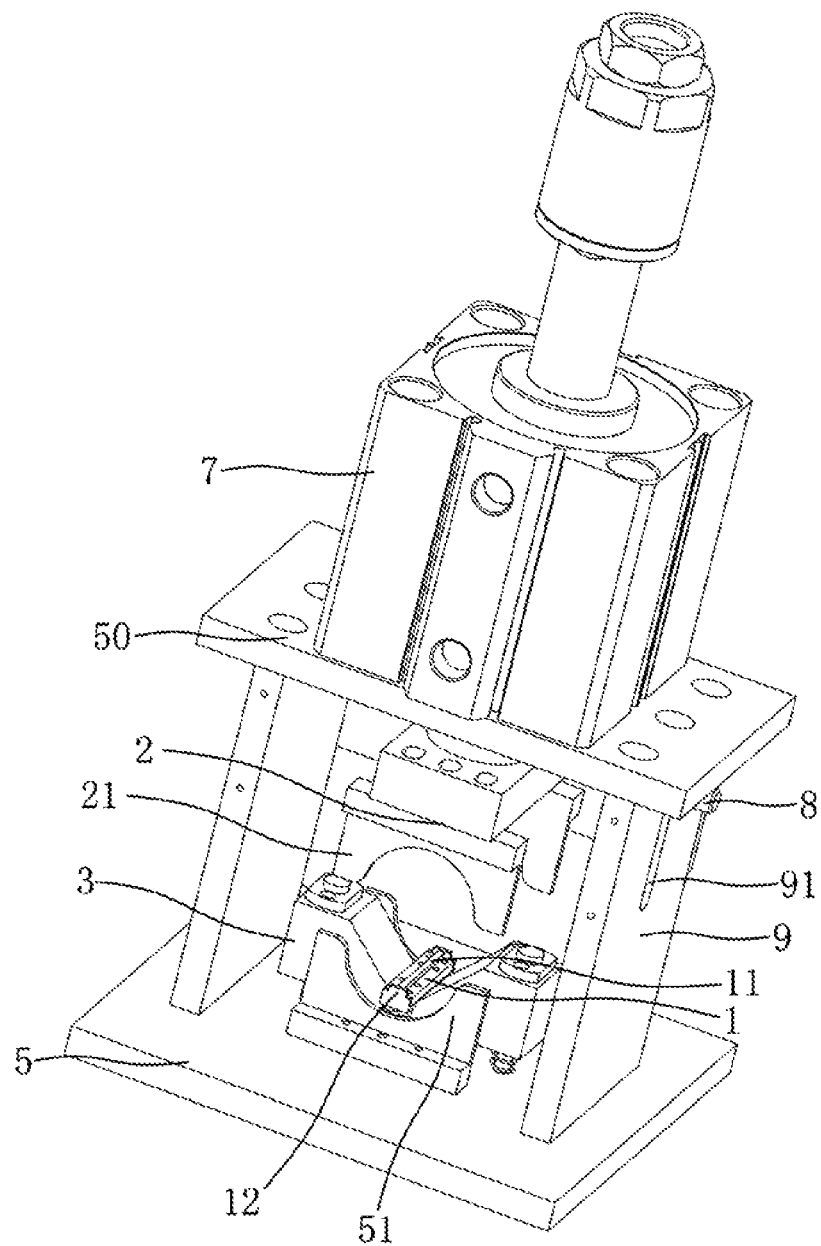
FIG. 1 is a structural diagram according to the present invention.
Figure 2:
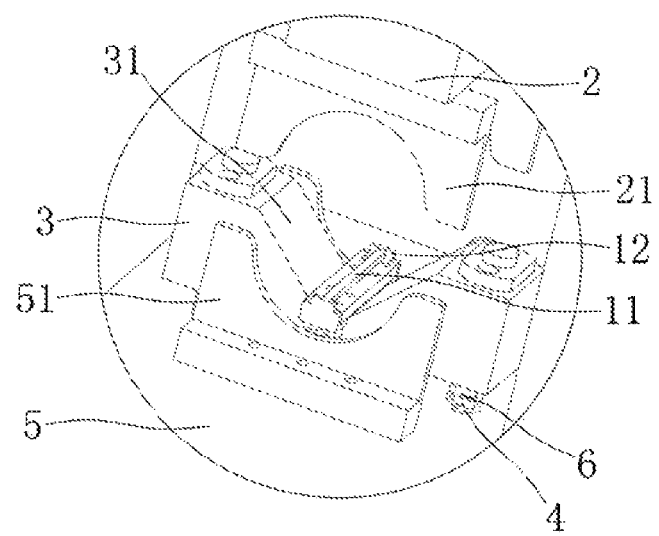
FIG. 2 is a structural diagram of a locating piece and a locating base according to the present invention.

As shown in FIGS. 1 and 2, the present invention provides a rotor coil shaping device, including a locating piece 1 and a press piece 2 located above the locating piece 1. A locating boss 11, extending upward and having a width the same as that of a rotor slot opening of a rotor, is provided in the middle of the locating piece 1 in a longitudinal direction, stop bosses 12 extending upward are provided at both front and rear ends of the locating piece 1, and upper shaping blades 21 each having an arc groove opening downward are fixed on a lower side of both front and rear ends of the press piece 2.

The locating piece 1 is detachably fixed on the locating base 3 by screws, and the locating base 3 is sleeved on two vertically arranged guide rods 4, and a lower end of each guide rod 4 is fixed to a base plate 5. A spring 6 sleeved on each guide rod 4 is provided between the locating base 3 and the base plate 5, lower shaping blades 51, each extending upward and having an arc groove opening upward, are provided on the base plate 5, and each lower shaping blade 51 located under each upper shaping blade 21 is provided on each of front and rear sides of locating base 3. A nut is screwed at an upper end of the guide rod 4 to prevent the upward disengagement of the locating base.

A V-groove opening upward is formed on the locating base 3 and includes two supporting groove faces 31 aslant arranged to form a V-shaped structure, and the locating piece 1 is fixed in the middle of the V-groove so that the locating piece 1 is located between the two supporting groove faces 31.

The press piece 2 is fixed at an output end of a press 7, and one end of a guide piece 8 is fixed to the press piece 2 while the other end thereof is located in a vertically arranged guide slot 91 of a fixed plate 9. The press 7 which is a gas cylinder is fixed on the base plate 5 by a bracket 50.

The present invention has the advantages of improving the production efficiency and reducing the labor intensity of workers.

The invention claimed is:

1. A rotor coil shaping device, comprising a locating piece and a press piece located above the locating piece, wherein a locating boss, extending upward and having a width the same as that of a rotor slot opening of a rotor, is provided in the middle of the locating piece in a longitudinal direction, a stop boss extending upward is provided on at least one of front and rear ends of the locating piece, and upper shaping blades each having an arc groove opening downward are fixed on a lower side of the press piece, wherein the locating piece is fixed on a locating base which is sleeved on two vertically arranged guide rods, and a lower end of each guide rod is fixed to the base plate; a spring sleeved on each guide rod is provided between the locating base and the base plate, and lower shaping blades, extending upward and having an arc groove opening upward, are provided on the base plate and located under the upper shaping blades.

2. The rotor coil shaping device according to claim 1, wherein the upper shaping blade is provided on both front and rear ends of the press piece, respectively, the lower shaping blade is provided at both front and rear sides of the locating base, respectively, and each lower shaping blade is located under each upper shaping blade.

3. The rotor coil shaping device according to claim 1, wherein the locating piece is detachably fixed on the locating base.

4. The rotor coil shaping device according to claim 1, wherein a V-groove opening upward is formed on the locating base and comprises two supporting groove faces aslant arranged to form a V-shaped structure, and the locating piece is fixed in the middle of the V-groove so that the locating piece is located between the two supporting groove faces.

5. The rotor coil shaping device according to claim 1, wherein the press piece is fixed at an output end of a press, and one end of a guide piece is fixed to the press piece while the other end thereof is located in a vertically arranged guide slot of a fixed plate.

* * * * *